(12) United States Patent
Parenti et al.

(10) Patent No.: US 8,635,707 B1
(45) Date of Patent: Jan. 21, 2014

(54) MANAGING OBJECT ACCESS

(75) Inventors: Mark A. Parenti, Milford, NH (US);
Stephen J. Todd, Shrewsbury, MA (US);
Gregory W. Lazar, Upton, MA (US);
Millard C. Taylor, II, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 143 days.

(21) Appl. No.: 12/893,347

(22) Filed: Sep. 29, 2010

Related U.S. Application Data

(63) Continuation-in-part of application No. 12/803,497, filed on Jun. 29, 2010.

(51) Int. Cl.
*G06F 21/00* (2013.01)

(52) U.S. Cl.
USPC ............. 726/27; 713/182; 713/185; 713/189; 713/193

(58) Field of Classification Search
USPC .......................................... 726/27
See application file for complete search history.

(56) References Cited

U.S. PATENT DOCUMENTS

| | | | | |
|---|---|---|---|---|
| 5,881,225 A * | 3/1999 | Worth | | 726/17 |
| 6,781,607 B1 * | 8/2004 | Benham | | 715/744 |
| 7,523,231 B1 * | 4/2009 | Gupta et al. | | 710/36 |
| 8,166,071 B1 * | 4/2012 | Korablev et al. | | 707/783 |
| 2003/0088786 A1 * | 5/2003 | Moran et al. | | 713/201 |
| 2003/0145074 A1 * | 7/2003 | Penick | | 709/223 |
| 2008/0098453 A1 * | 4/2008 | Hinton et al. | | 726/1 |
| 2008/0120302 A1 * | 5/2008 | Thompson et al. | | 707/9 |
| 2009/0138319 A1 * | 5/2009 | Ratnala | | 705/9 |
| 2009/0157580 A1 * | 6/2009 | Abnous et al. | | 706/45 |
| 2009/0259662 A1 * | 10/2009 | Cragun et al. | | 707/9 |
| 2010/0058197 A1 * | 3/2010 | Chee et al. | | 715/751 |

OTHER PUBLICATIONS

Bertino et al., Intrusion Detection in RBAC-administered Databases, Dec. 2005, Proceedings of the 21st Annual Computer Security Applications Conference ACSAC 2005, pp. 173-182.*

* cited by examiner

*Primary Examiner* — Taghi Arani
*Assistant Examiner* — Kenneth Chang
(74) *Attorney, Agent, or Firm* — Krishnendu Gupta; Jason A. Reyes

(57) ABSTRACT

A method for use in managing object access is disclosed. A request is received at a reference monitor, wherein the request comprises an object type, an action associated with the object, credentials associated with a user, and access information. Template information is received at the reference monitor, wherein the template information specifies allowable access for the object using qualifiers for the object. For the user, determining at a management request engine whether to allow the action associated with the object based on the request and the template. Also disclosed is a system for use in managing object access.

16 Claims, 20 Drawing Sheets

```
702         [QUALIFIERS]
704         CLASS name1
            {
706                 [QUALIFIERS]
708                 Attribute_type  ATT1
                            :
710                 [QUALIFIERS]
712                 Attribute_type  ATTN
                            :
714                 [QUALIFIERS]
716                 Method1 (parameter(s))
                            :
718                 [QUALIFIERS]
720                 CLASS name2 Object2
            }
```

```
902    [EMC_Roles{"administrator(Write)", "manager", "monitor"},
904    EMC_UserLevel{"Expert"}]
906    class ExchangeApplication : EMC_ExchangeApplication
       {
908      [Description("The overall Exchange Application Size"),
910      EMC_UserLevel{"Novice", "Generalist"}]
912      uint64 Size;

914      [Key, Description("Application id"),
916      EMC_UserLevel{"Novice", "Generalist"}]
918      string ID;

920      [Write, Description("Number of mailboxes"),
922      EMC_UserLevel{"Generalist"}]
924      uint64 NumberOfMailboxes;

926      [Write, Description("Size of mailbox"),
928      EMC_UserLevel{"Generalist"}]
930      uint64 SizeOfMailbox;

932      [Write, Description("Number of high users")]
934      uint64 NumberOfHighUsers;

936      [Write, Description("Number of medium users")]
938      uint64 NumberOfMidUsers;

940      [Write, Description("Number of low users")]
942      uint64 NumberOfLowUsers;

944      [Write, Description("Exchange application description"),
946      EMC_UserLevel{"Novice", "Generalist"}]
948      string Description;

950      [Write, Description("Exchange application name"),
952      EMC_UserLevel{"Novice", "Generalist"}]
954      string ElementName;

956      [Description("Installation date")]
958      DateTime InstallDate;

960      uint16 OperationalStatus[];
       };
```

FIG. 10

```
            [EMC_Roles{"administrator", "manager"},
1102         EMC_UserLevel{"Expert", "Generalist"}]
1104        class StorageGroup : EMC_ExchangeStorageGroup
1106        {

1208         [Description("The size of a Storage Group")]
1110         uint64 Size;

1112         [Description("Element name"), Key]
1114         string DeviceID;

1116         [Description("Element name"), Write]
1118         string ElementName;

1120         [Decription("Description"), Write ]
1122         string Description;

1124         [Description("Install Date")]
1126         DateTime InstallDate;

1128         [Description("Date the Storage Group was last modified")]
1130         DateTime LastModifyDate;
            };
```

FIG. 12

```
1302     [EMC_Roles{"administrator", "monitor", "manager"},
1304     EMC_UserLevel{"Generalist", "expert"}],
1306     class Component : EMC_Component
         {
1312        ExchangeApplication REF GroupComponent;
1314        StorageGroup REF PartComponent;
         }
```

FIG. 14

MANAGING OBJECT ACCESS

RELATED APPLICATION

This application is a continuation-in-part application claiming priority to co-pending U.S. patent application Ser. No. 12/803,497, filed Jun. 29, 2010, reference no. EMC-10-099, entitled "OBJECT QUALIFIERS FOR MULTI-DIMENSIONAL OBJECT MODEL", the entirety of which patent application is hereby incorporated by reference herein.

BACKGROUND

1. Technical Field

This application generally relates to managing object access.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data may be stored on a data storage system in accordance with any one or more different data models. The data storage system may store data, for example, as objects and the data may be used by multiple applications and/or hosts. Individuals may need to access different portions of the data and there is a need to restrict or control an individual's access to appropriate portions of the data. It may be desirable to utilize a flexible technique to control such access and provide a sufficient granularity of control such as may be needed in complex data storage systems and/or complex data storage system environments.

SUMMARY OF THE INVENTION

A method for use in managing object access is disclosed. A request is received at a reference monitor, wherein the request comprises an object type, an action associated with the object, credentials associated with a user, and access information. Template information is received at the reference monitor, wherein the template information specifies allowable access for the object using qualifiers for the object. For the user, determining at a management request engine whether to allow the action associated with the object based on the request and the template. Also disclosed is a system for use in managing object access.

BRIEF DESCRIPTION OF THE DRAWINGS

Features and advantages of the present invention will become more apparent from the following detailed description of exemplary embodiments thereof taken in conjunction with the accompanying drawings in which:

FIGS. 10, 12 and 14 are examples of portions of a template that may be used in an embodiment in accordance with techniques herein;

DETAILED DESCRIPTION OF EMBODIMENT(S)

Figure 1:
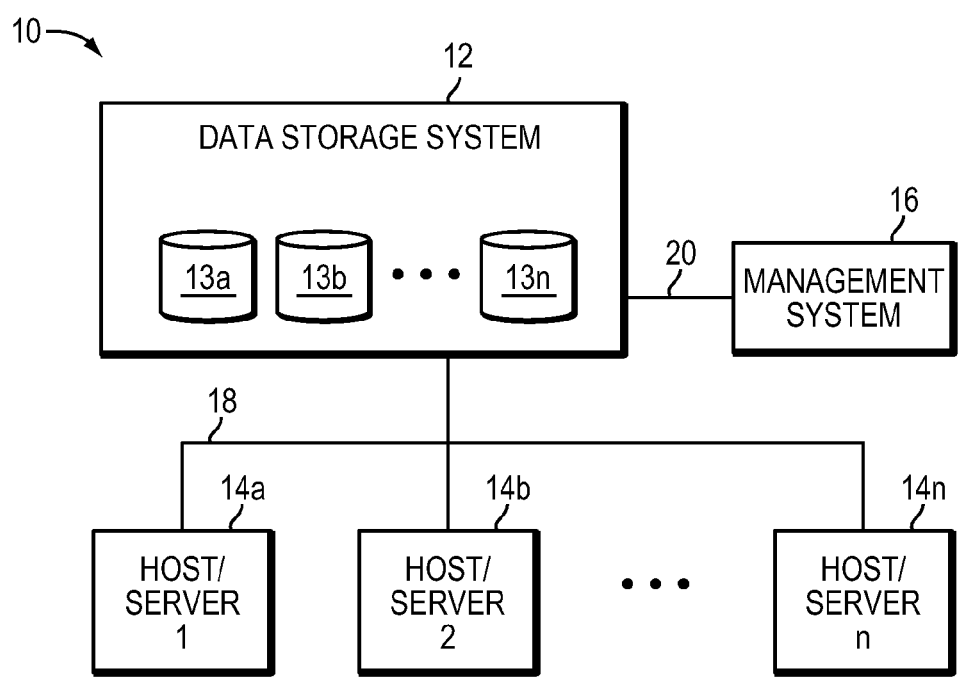
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14*a*-14*n* through communication medium 18. The system 10 also includes a management system 16 connected to one or more data storage systems 12 through communication medium 20. In this embodiment of the system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14*a*-14*n* may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with performing data storage administration and other tasks such as storing the data of the hosts on the appliance, configuring the data storage for use by the hosts, backing up data from the storage system, and the like. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Data may be stored on one or more data storage systems in accordance with any one or more different data models. The data storage system may store data, for example, as objects and the data may be used by multiple applications and/or hosts as clients or tenants. Thus, the data storage system may provide data storage in a multi-tenant environment. Individuals may need to access different portions of the data and there is a need to restrict or control an individual's access to appropriate portions of the data. Described in following paragraphs are techniques that may be used to control access to data where such techniques also provide a sufficient granularity of control as may be needed in complex data storage systems and/or complex data storage environments. Such techniques may be used in connection with individual users performing, for example, data storage administration.

Described herein are techniques that may be used in connection with a data object model that may be characterized as having multiple dimensions. Although the data object model described herein has a variety of uses, the data object model may be used to describe accessibility to, for example, objects and attributes used for managing a system, such as a data storage system. As an example, the data object model may define one or more objects representing an application, data storage areas used for storing application data, operations performed on the application data and storage areas in connection with storage management, and attributes that may be viewed, and modified in connection with performing data storage management tasks. A user, such as a data storage administrator, which has access to particular objects, attributes and methods is permitted to perform various operations for data storage system management as indicated by the appropriate objects, attributes, and methods to which the user has access. To further illustrate, the data model may be used to represent an email application, data stored by the email application on the data storage system, and what operations or tasks may be performed on the data areas used for storing the application data, what attributes characterize such data areas (e.g., which particular LUNs are used for storage, the RAID level (e.g., RAID-1, RAID-6, etc.) and configuration (e.g., number of data and parity devices) for such data areas, the data protection process performed such as snapshot or backup for such data areas. In accordance with techniques herein, a user such as a data storage administrator may be allowed to access particular objects, methods, or attributes where such allowed access to a particular object, attribute, or method indicates that the user can perform, for example, the associated method for the object, perform a particular operation for one of the object attributes. Thus, by permitting a user to have access to selected objects, methods, and attributes, the data object model may be used to describe the operations the user is allowed to perform for data management, the attributes the user is allowed to view, modify, or otherwise operate on to perform data management, and the like. These and other uses of the techniques herein will become apparent to those skilled in the art with the benefit of further description as set forth in following paragraphs. Although the data model may be described herein with one or more particular applications and uses, the techniques herein should not be construed as limited to these presented herein for illustration and example.

Figure 2:
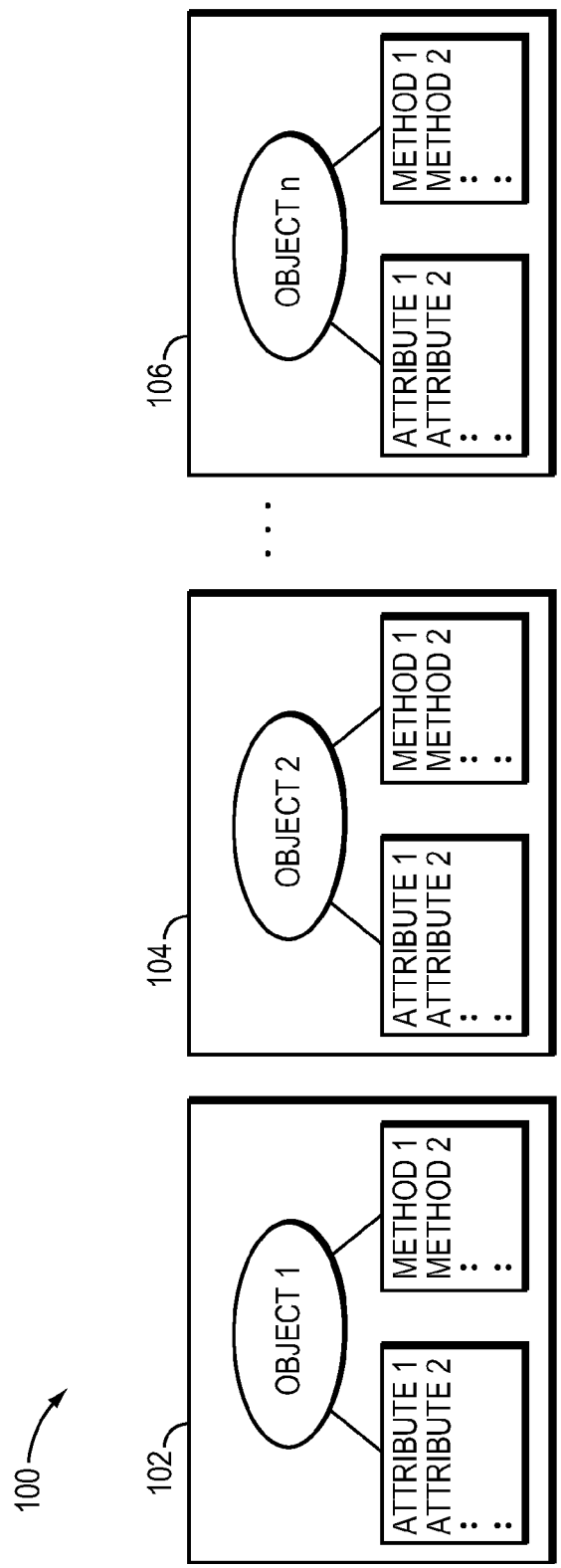
FIGS. 2-6 illustrate different dimensions that may be associated with a data model in accordance with techniques herein.

Referring to FIG. 2, shown is an example illustrating a first type of dimension of an object model. Shown in the example 100 are a plurality of objects 1-*n*, denoted 102-106. Each object may include associated attributes and methods. As known in the art, attributes describe or characterize different aspects of the object. An object's methods may be invoked to perform operations on the object such as, for example, to create an object, update data of the object, display information about the object, and the like. The objects 102-106 in the example 100 may be characterized as raw or basic objects included in a flat, enumerable namespace.

In a system having an object model based on only the first dimension of FIG. 2, any user may access any object, examine and/or operate on any attribute, and invoke any method.

Figure 3:
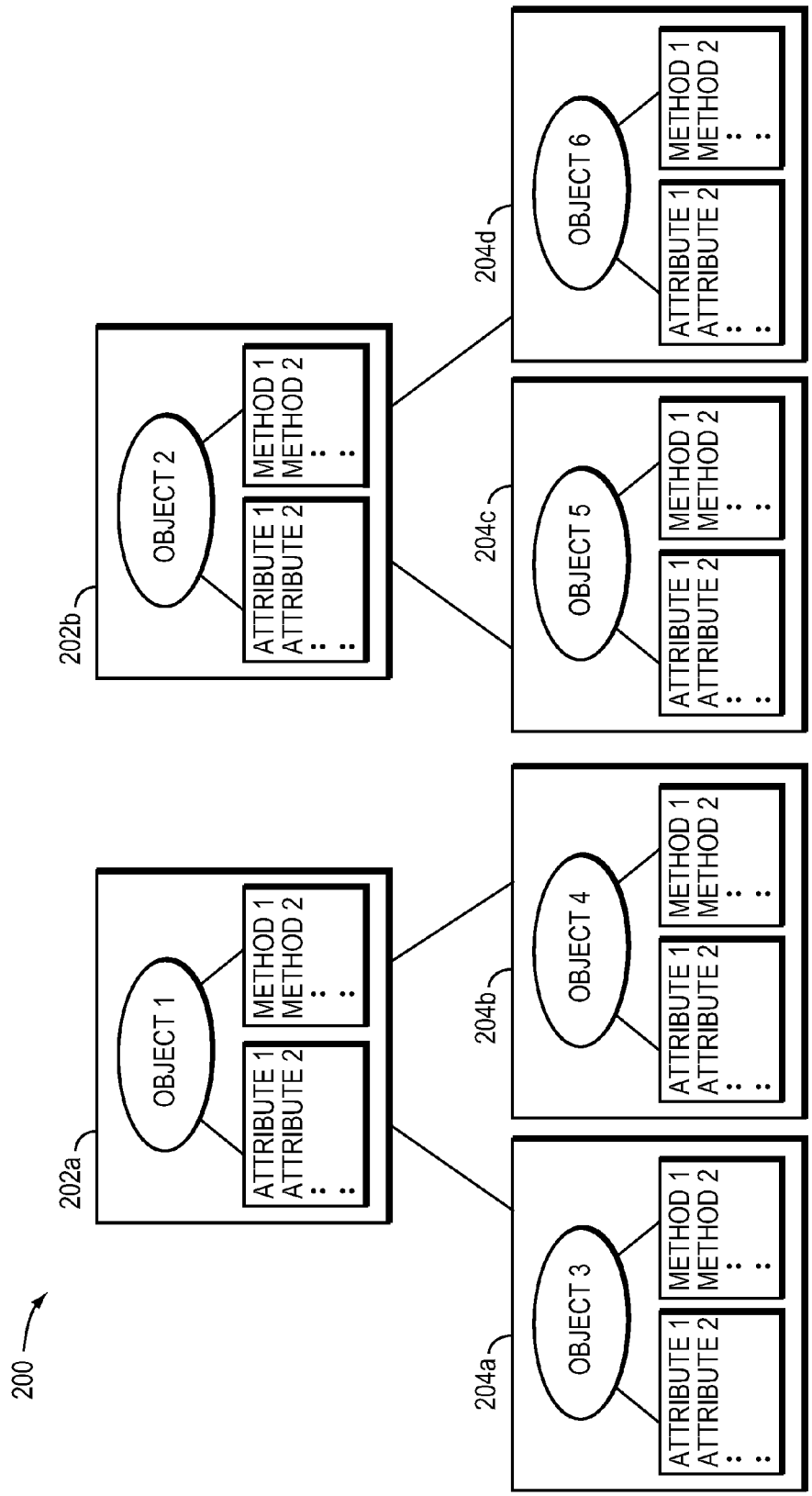

Referring to FIG. 3, shown is an example illustrating a second type of dimension of an object model which builds upon the first dimension and objects of FIG. 2. Shown in the example 200 are a plurality of objects 202*a*, 202*b*, and 204*a*-204*d*. Elements 204*a*-204*d* may represent raw or basic objects as illustrated in FIG. 2. Elements 202*a* and 202*b* may represent composite objects which form a hierarchical object model. Each of the composite objects 202*a*, 202*b* may have attributes and methods. Additionally, each composite object 202*a* and 202*b* may be associated with one or more raw or basic objects. It should be noted that a composite object may be associated with any number of raw or basic objects rather than just two as illustrated in the example 200. Furthermore, the hierarchical object model may have more than two levels as illustrated. For example, there may be three levels or more in the object model hierarchy depending on the associations between objects. As an example of a three level object model, a first composite object may be associated with a second composite object, where the second composite object may be associated with several raw or basic objects. As a variation with reference to the example 200, the foregoing may be illustrated by having yet another object 7 associated with object 3 (204*a*) so that 202*a* and 204*a* are composite objects and 204*b* and the new object 7 are raw or basic objects.

An association between two objects may represent any type of relationship between the objects. For example, a composite object may be an object representing an email application such as Microsoft Exchange. The composite object may be associated with three raw objects—2 LUN objects and a third object that is a cache or database object. The foregoing three raw objects may also be characterized as child objects of the composite object. The raw objects may represent data storage areas used by the email application, where the email application is represented by the composite object.

In a system having an object model based on only the dimensions of FIG. 3, any user may access any composite object and its associated raw objects. Any user may also examine and/or operate on any attribute and invoke any method of any such composite object and its associated raw objects.

Figure 4:
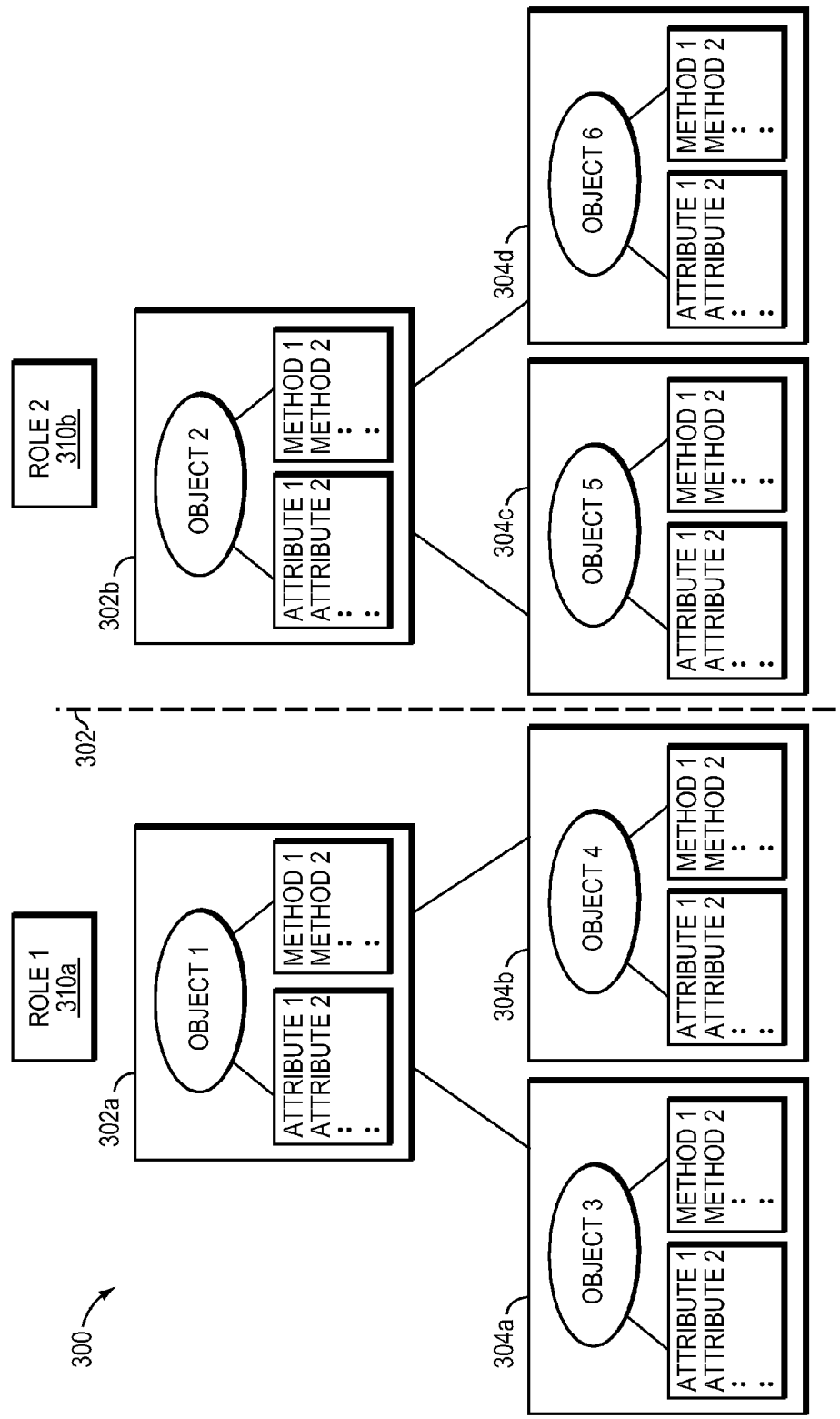

Referring to FIG. 4, shown is an example illustrating a third type of dimension of an object model which builds upon that as described above in connection with FIGS. 2 and 3. Shown in the example 300 are a plurality of objects 302, 302*b*, and 304*a*-304*d*. Elements 304*a*-304*d* may represent raw or basic objects. Elements 302*a* and 302*b* may represent composite objects. In the example 300, roles may be used to restrict access to a portion of the existing objects. Each of the defined roles may relate to one or more aspects such as related to one or more of a job function, title, particular technical area(s), particular application(s), and the like. For example, a first role of application 1 administrator may perform data storage administration tasks for a first application. A second role of application 2 administrator may similarly perform data storage administration tasks for a second application different from the first application. The tasks performed by any user having role 1 or role 2 may include performing data storage provisioning, backup and restoration operations, and the like. Each of the foregoing two defined roles each represented by one of 310a and 310b. A user assigned role 310a may have restricted access to a portion of existing objects such as to the left of the dashed line 302. A user assigned role 310b may have restricted access to a portion of existing objects such as to the right of the dashed line 302. Thus, roles may be used to control or restrict an assigned user's access to a subset of existing objects.

In a system having an object model based on only the dimensions of FIG. 4, access to composite objects, their associated raw objects, and any attribute and method thereof may be restricted based on roles. Thus, roles may be used to restrict or limit breadth with respect to all information associated with an object (e.g., allow/disallow access to an object and all its associated information (e.g., all associated objects, methods and attributes). However, roles may disallow or restrict access to only a portion of information associated with an object. In other words, a role may be used to allow/disallow access to an object and all its associated information but may not allow a sufficient granularity of control to allow/disallow access to only a portion of information associated with an object such as allow access to the composite object but not one or more associated raw objects, allow access to only some of the attributes and/or methods of the composite object or any of its associated raw objects, and the like.

Figure 5:
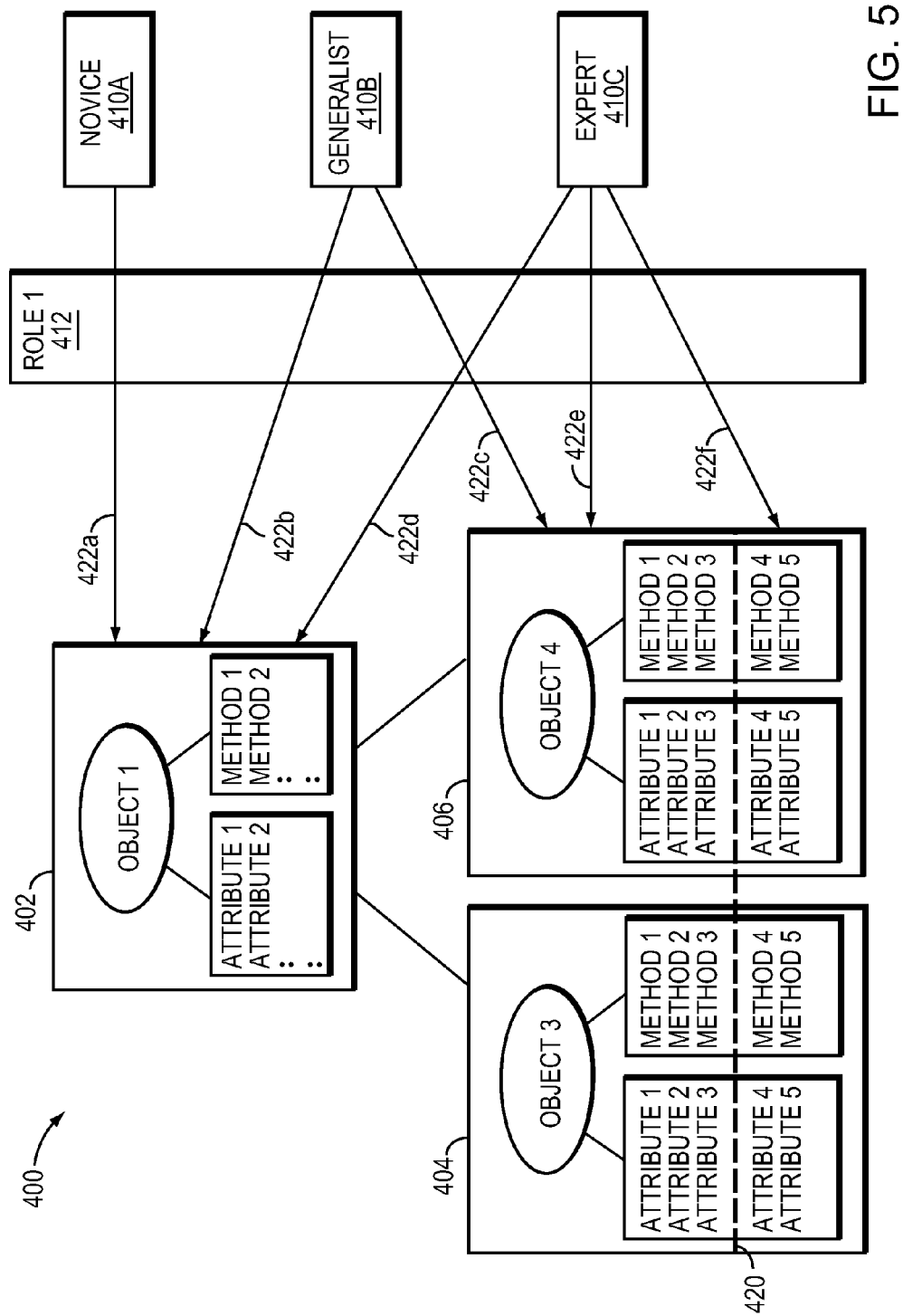

Referring to FIG. 5, shown is an example illustrating a fourth type of dimension of an object model which builds upon that as described above in connection with FIGS. 2, 3 and 4. Shown in the example 400 are a plurality of objects 402, 404 and 406. Elements 404 and 406 may represent raw or basic objects. Element 402 may represent a composite object. Element 412 may represent a single defined role, role1. For each defined role, one or more levels of proficiency or skill may be also be specified. In the example 400, three skill levels are specified and denoted (in increasing order of skill or proficiency) as novice 410a, generalist or intermediate 410b and expert 410c. The fourth type of dimension allows for specifying different variations in skill level for a single role. Due to the varying levels of skill, each of 410a-410c for a single role may have varying levels of allowed access to objects and associated information.

The knowledge or skill levels 410a-410c may provide an additional level of filtering or access to composite objects, raw objects, and/or attributes and methods thereof. As described above, roles by themselves may not provide a sufficient granularity of control in that roles may not allow for specifying or restricting access to only some of the information associated with a particular object. Knowledge or skill levels in combination with roles may be used to limit access to only a portion of information associated with a single object, such as a composite object. In other words, roles and skill levels may be used to provide a sufficient granularity of control to allow/disallow access to only a portion of information associated with an object such as allow access to a composite object but not one or more associated raw objects, allow access to only some of the attributes and/or methods of the composite object or any of its associated raw objects, and the like. Thus, use of roles and skill levels may be used to provide a finer granularity of access control than roles alone with respect to both breadth and depth of existing objects. Depth may refer to limiting access with respect to information associated with a particular object (e.g. limiting access to an associated object such as a raw object associated with a composite object, or limiting access to attributes and methods of an object (e.g., composite or raw object) or one of its associated objects (e.g., raw object)).

As denoted by arrow 422a, a novice 410a may be allowed to only access composite object 402 and the attributes and methods of 402. However, the novice 410a may not be allowed to access associated raw objects 404 and 406, or any attribute or method thereof. As denoted by 422b and 422c, generalist 410b may be allowed to access composite object 402 (and attributes and methods of 402) and only a portion of the information for raw objects 404 and 406. As illustrated, the generalist 410b is allowed to access attributes and methods of 404 and 406 which are above the line 420. However, generalist 410b cannot access attributes 4, 5 and methods 4, 5 of objects 404 and 406. As denoted by 422d, 422e and 422f, expert 410c may be allowed to access all objects 402, 404 and 406 and any attribute and method thereof. Thus, a user assigned role 1 412 and expert level 410c is allowed unrestricted access to all objects, attributes and methods of the example 400.

To further illustrate, a first role (role 1 412) defined as general data storage administrator may perform data storage administration tasks for several different applications. The tasks may include performing data storage provisioning, backup and restoration operations, and the like for multiple applications. A user having the first role may be required to have access to object 402. However, the particular operations or tasks that may be performed by a data storage administrator assigned role 1 and having a beginner or novice level 410a of skill may be restricted in comparison to either of 410b and 410c denoting a higher level of skill and proficiency. A novice may be restricted for a variety of different reasons so that the novice user, for example, is not allowed to perform operations requiring greater skill and knowledge and is not able to display information and detail (e.g., particular attributes) about which he/she may know nothing. As skill level increases, the amount of information, types of allowed operations, level of detail, and the like, may also accordingly increase or vary.

It should be noted that different levels of proficiency or skill and roles are described, for example, in U.S. Pat. No. 7,523,231 which issued on Apr. 21, 2009, entitled Application Aware Storage, (the '231 patent), which is hereby incorporated by reference herein, and U.S. patent application Ser. No. 11/906,131, filed Sep. 28, 2007, Gupta, et al., entitled Security and Licensing with Application Aware Storage, which is hereby incorporated by reference herein.

Although three skill or proficiency levels are illustrated in the example of FIG. 5, an embodiment may provide for specifying any number of such levels for each role. It should be noted that use of terminology regarding a level of skill or proficiency may also be referred to herein as a level of knowledge and/or expertise.

Figure 6:
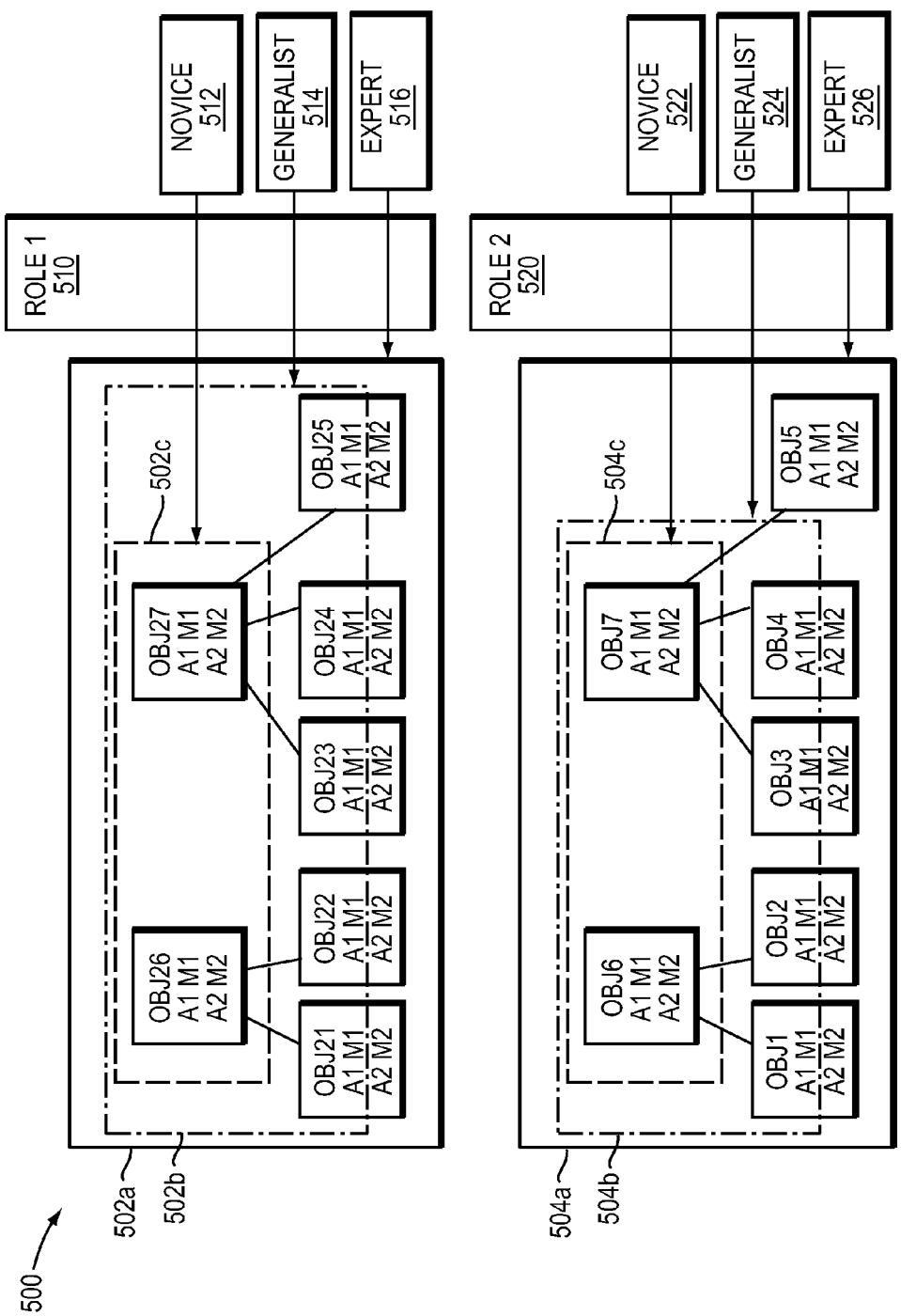

Referring to FIG. 6, shown is an example illustrating a fifth type of dimension of an object model which builds upon that as described above in connection with FIGS. 2, 3, 4 and 5. The example 500 illustrates an embodiment having multiple instances of roles and associated skill or proficiency levels for each such role. Furthermore, the example 500 identifies which objects and associated information are accessible for each skill level of a role. In accordance with techniques herein, an embodiment may define a template for each such role. The template may define the one or more associated skill levels applicable for use with the role. The template may also specify, for each of the skill levels of a role, which objects, related child objects, and object information (e.g., attributes and/or methods of the object, attributed and/or methods of a related object) are accessible. An embodiment may include, or otherwise provide for creating, a plurality of such templates, where each such template is defined for a particular role. The template for a role may then be used in connection with specifying which objects are accessible to a user, where the user has an account, user identifier, and the like, which is assigned the particular role and one of the skill levels for the role.

In the example 500, an object (obj) and its identifier (N, N being an integer) are denoted as "objN" (e.g., obj26), each attribute (A) and its associated identifier (n, n being an integer) are denoted as "An" (e.g., A1), and each method (M) and its associated identifier (n, n being an integer) are denoted as "Mn" (e.g., M1).

With reference to FIG. 6, the example 500 includes role 1 510 and associated skill levels (512, 514 and 516), and role 2 520 and associated skill levels (522, 524 and 526). A first template may be defined for role 1 510 identifying the skill levels 512, 514 and 516 and specifying the objects and object information accessible for each such skill level. For a user assigned role 1 510, novice level 512, the user can access the objects and object information included in dashed box 502c (e.g., objects 26 and 27 (obj26 and obj27) and the attributes and methods of objects 26 and 27). For a user assigned role 1 510, generalist level 514, the user can access the objects and object information included in dashed box 502b (e.g., objects 26 and 27, all attributes and methods of objects 26 and 27, and attribute 1 (A1) and method1 (M1) of objects 21, 22, 23, 24 and 25). However, generalist 514 cannot access attribute 2 (A2) and method2 (M2) of objects 21, 22, 23, 24 and 25. For a user assigned role 1 510, expert level 516, the user can access all objects and object information included in box 502a (e.g., objects 21-27 and all attributes and methods thereof).

A second template may be defined for role 2 520 identifying the skill levels 522, 524 and 526 and specifying the objects and object information accessible for each such skill level. For a user assigned role 2 520, novice level 522, the user can access the objects and object information included in dashed box 504c (e.g., objects 6 and 7 and the attributes and methods of objects 6 and 7). For a user assigned role 2 520, generalist level 524, the user can access the objects and object information included in dashed box 504b (e.g., objects 6 and 7, all attributes and methods of objects 6 and 7, and attribute 1 (A1) and method1 (M1) of objects 1-4). However, generalist 524 cannot access attribute 2 (A2) and method2 (M2) of objects 1-4 and cannot access anything regarding object 5. For a user assigned role 2 520, expert level 526, the user can access all objects and object information included in box 504a (e.g., objects 1-7 and all attributes and methods thereof).

As a variation to the foregoing, a single template may be defined for each possible combination of role and level of expertise. With reference to FIG. 6 with this variation, 3 templates may be defined for role 1 510 and 3 templates may be defined for role 2 520. This variation may be a matter of how templates are implemented for each role. Thus, although examples provided herein for illustration may refer to a single template for a role, it should be noted that a different template for each combination of role and level of expertise may be used.

Templates may be used to provide a multi-dimensional data model. The templates may be used to provide an object model and implement a flexible data management framework for restricting or filtering access to selected objects (e.g., composite, and related objects) and/or selected portions of object information (e.g., object attributes and methods) for a user assigned a role and an associated level of expertise. Other criteria in addition to the role and level of expertise in defining a template and restricting or filtering access to selected objects and/or object information may also be used. Such other restricting or filtering criteria may relate to, for example, particular application(s) identified and other indicator(s) used to infer a level of expertise. The other indicators may relate to the complexity of the data storage system and/or data storage environment as well as the identified applications.

In accordance with the current techniques, the template and role and/or level of expertise selection for a particular user (e.g., as may be identified with a user account and/or user identifier) may be, in at least one embodiment, used in connection with managing which actions can be performed on an object. For example, a template may be obtained for the object based on information associated with the particular action and object. The template may then be used to determine what actions on the particular object may be performed by the particular user. Thus, the actions which may be performed or initiated by a user may vary depending on the template obtained and the role and/or level of expertise of the user. In an alternative embodiment, the template may be used to filter what information is returned to a user interface.

It should be noted that although the templates are described with reference to a data model related to objects, the templates may also be applicable for use with other types of data models.

Described above is an example of a multi-dimensional object model as may be used in connection with facilitating management operations, such as, for example, in connection with data storage management. The foregoing multi-dimensional object model is described in more detail, for example, in U.S. patent application Ser. No. 12/798,234, filed Mar. 31, 2010, entitled Multi-Dimensional Object Model for Storage Management, which is hereby incorporated by reference herein, and in U.S. patent application Ser. No. 12/803,497, filed Jun. 29, 2010, entitled Object Qualifiers for Multi-Dimensional Object Model (the '497 patent), which is hereby incorporated by reference herein.

What will now be described are ways of implementing the foregoing multi-dimensional object model using an object model description with qualifiers. In connection with following paragraphs, a composite class may refer to a class of a composite object as described and illustrated above. A composite class may be characterized as a first class definition which includes a member or field thereof which has a type of a second class. Thus, an object of the first class is a composite object having embedded therein a second object of the second class. The second object may also be referred to herein as a raw or basic object. The second class may also be referred to as an embedded class with respect to the first class. The object model description may be included in a template as described elsewhere herein in more detail. The qualifiers may be used to specify one or more roles and/or one or more levels of expertise. The forgoing qualifiers may be used to identify which classes, attributes, methods, method parameters, for example, are accessible to different roles and/or expertise levels. In some circumstances, one or more class definitions may also be included. The template may define a class and may specify which qualifiers are applicable to a class, attribute, or method. For example, the template may specify qualifiers applicable to an entire class (e.g., including attributes and methods defined as members of the class and, if the class is a composite class including another embedded class as a member, any raw or basic objects associated therewith and included at a lower level in the object hierarchy), applicable to a single attribute or single method, to a single raw or basic object of a composite object, and the like.

It should be noted that as described above in an object model, a composite object may be an instance of a composite class including one or more members each having a type which is a class (e.g. embedded class). The composite object may be associated with one or more raw or basic objects which are hierarchically at a lower level in the object model than the composite object. For example, with reference back to FIG. 5, a hierarchical arrangement of objects is illustrated. Object 1 402 may be a composite object including raw or basic objects 404 and 406. Object 1 402 may be an object of a composite class including two members, where a first of the two members is a first class types corresponding to object 404 and a second of the two members is a second class type corresponding to object 406. The association between a composite object, such as 402, and a raw or basic object, such as each of 404 and 406, may represent one of a variety of different relationships (hierarchical and non-hierarchical) between objects in an embodiment. A composite object may be a first object having one or more embedded objects (also referred to herein as subobjects). The one or more embedded objects may correspond, respectively, to one or more raw objects located at a lower level in the object model than the composite object. In this case, the class definition for the composite object may be a composite class that defines each of the one or more embedded objects of an embedded class type as a member or element of the class definition. More generally, the composite object-embedded object relationship (also the composite class-embedded class relationship) as described herein may be one type of relationship or association in an embodiment. It should be noted that although particular examples herein may refer to and illustrate the composite object-embedded object relationship, there may also be other types of relationships or associations between objects and classes of objects.

To illustrate the use of qualifiers in a template, an exemplary class definition will be considered in which the class definition may include as members any one or more attributes, methods, and/or embedded classes. It should be noted that an embedded class of a composite class may also be characterized as an attribute or property of the composite class. For purposes of describing the scoping rules and application of qualifiers, the relationship between the class and any members defined in the class (e.g., contained or embedded within the class) may be considered. The class (or objects of the class) may have a first qualifier scoping level and all members contained within the class (e.g., defined within the class definition) may have a second qualifier scoping level which is nested or contained within the first qualifier scoping level. Also, a template may be wrote using a hierarchical description language having levels or depths corresponding to the foregoing qualifier scoping levels and qualifier scoping level hierarchy. With reference again to FIG. 5, object 1 402 may have a class definition which includes one or more attributes and methods used in connection with object 1 402. The class definition for object 1 402 may also define objects 404 and 406 as members of classes embedded within the class definition of object 402. Each of objects 404 and 406 may also include respective attributes and methods as illustrated. The classes (and objects which are instances of these classes), as well as attributes and methods, of a class definition form a qualifier scoping level hierarchy where the member classes embedded within a composite class may be considered at a same qualifier scoping level as a member attribute or method of the composite class. The foregoing qualifier scoping hierarchy may be expressed using a hierarchical description language with language elements, referred to herein as qualifiers, for specifying various roles and/or expertise levels.

Figure 7:
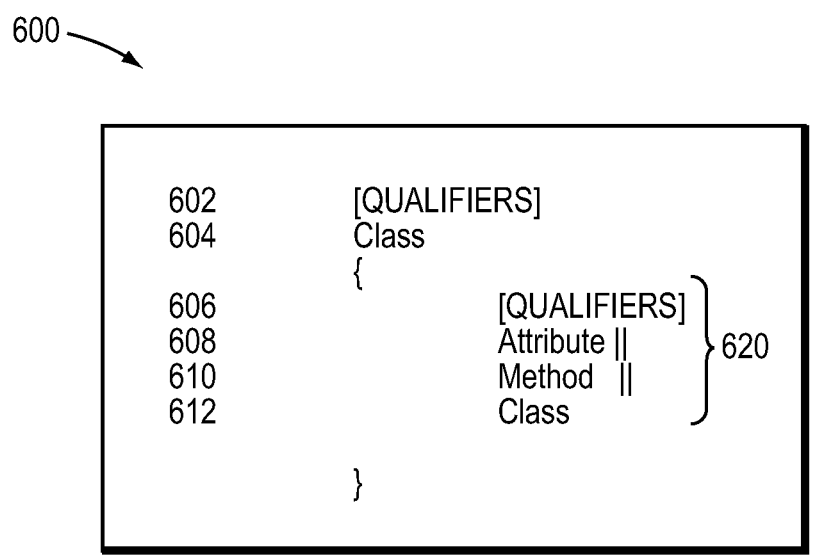
FIGS. 7 and 8 are examples illustrating how qualifiers may be specified in a template in accordance with techniques herein.

Referring to FIG. 7, shown is an example representation of a general format of a description language that may be used in a template to describe a class definition and its members. The language may provide language elements in any one of a variety of different suitable syntaxes having a general format that may be expressed as in the example 600. In the example 600, line 604 specifies a defined class name. The [QUALIFIERS] at line 602 identify one or more optional qualifiers specifying roles and/or levels of expertise as applied to an object of the class 604 and also members or items of the object's class. The class definition 604 may include, for example, one or more attributes, methods or embedded classes (e.g., embedded objects) as members. The qualifiers of line 602 are also applied to all of the foregoing members of the class 604. Elements 608, 610 and 612 represent that a single member or item 620 within a class definition (line 604) may be an attribute (line 608), or a method (line 610), or a class (line 612). The "II" in the example 600 represents the logical OR operator and that each member or item 620 within the class 604 may be one of the elements represented by lines 608, 610 and 612. It should be noted that the language may also provide support for additional elements than as described and illustrated in FIG. 6 and elsewhere herein. Element 606 identifies one or more optional qualifiers which are applicable to the item or member 620. In accordance with an example syntax, the qualifiers of line 602 are applied to all objects of the class of line 604 and to all members or items embedded within the class at line 604. The qualifiers of line 606 are additionally applied to the single member or item as represented by 620. It should be noted that if item 620 has a class type and thus is an embedded object, the qualifiers of line 606 have an applicable scope to all members or items embedded within the object 620. An object of the class at line 604 may have a first scoping level and items or members defined within the object's class are thus contained within object and have a second scoping level nested within the first scoping level. An additional third scoping level within the second scoping level may be associated with items or members of the class definition for the object at line 612. More generally, there may exist any number of qualifier scoping levels in accordance with an allowable number of nesting levels of embedded classes of objects or other data types.

A template may refer to class definition and there may be one or more objects which are elsewhere declared as instances or objects of a defined class. The template may include appropriate language elements to describe the attributes, objects, and methods defined as members of that class along with any optional qualifiers. In other words, the template may include multiple occurrences of item or member 620 for a single object in accordance with the class definition for that particular object.

Figure 8:

Referring to FIG. 8, shown is an example 700 with additional detail of an exemplary template for a class definition "name 1". The class "name 1" at line 704 has qualifiers specified at line 702. The defined class, "name1" of 704 includes attribute ATT1 (line 708) with associated qualifiers at line 706, attribute ATTN (line 712) with associated qualifiers at line 710, method Method1 (line 716) with associated qualifiers at line 714, and embedded object2 of class "name2" (line 720) with its associated qualifiers at line 718. Each of the optional qualifiers specified at lines 702, 706, 710, 714, and 718 may identify one or more roles and/or levels of expertise. When a first object of class "name1" is instantiated, the first object has an embedded object2 of class "name2" as a field thereof.

As described above, qualifiers may have an applicable scope based on their associated qualifier scoping level and placement within the template in accordance with the object class definition(s). When a qualifier is specified for a class at a particular qualifier scoping level, the qualifier is applied to the entire class including all items or members of the class (e.g., all attributes, methods, and embedded classes contained within the class). When a qualifier is specified for a particular item or member of the class (e.g., item or member of the class definition), the qualifier is applied to that item or member. In the case where the item or member is an embedded object (e.g., member having a type which is a class), the qualifiers of the embedded object are also applied to all other members or items contained within that embedded object. It should be noted that, as described in connection with other examples herein, although FIG. 8 references only a single embedded object (e.g., object2 as a member that has a type of class "name 2" at line 720), a class definition for "name1" may include multiple embedded objects at the same level as "object2". Also, the class definition for name2 may further include as members one or more other embedded objects. The classes (and instances or objects thereof), attributes, methods, and embedded classes (and instances or objects thereof may form a qualifier scoping hierarchy having a nesting of qualifier scoping levels. There is no limit to the number of nesting levels. It should be noted that the foregoing nesting of classes and objects and qualifier scoping levels described herein may be more generally applied to any attribute type such as, for example, a defined attribute type which may be analogous to a C++ language structure. With reference to FIG. 8, line 720 references class "name 2" which, when an object of class "name 1" is instantiated, results in the object of class "name1" containing an embedded object of class "name 2". In an implementation which allows embedded objects, name2 may refer to a previously defined class occurring prior to its reference or usage in line 720.

The qualifiers specified at a first level of the qualifier scoping hierarchy (e.g., line 702) are also applied to any other lower levels of the qualifier scoping hierarchy nested within the foregoing first level. For example, the qualifiers at line 702 are applied to an object 1 of class name1 and also to each of the members or items at lines 708, 712, 716 and 720 contained within object1. Additionally, with respect to those items contained within object1, the qualifiers from the first level are applied in combination with any other qualifiers specified for such individual items at the lower nested levels. For example, the qualifiers at line 702 (first level) are applied in combination with the qualifiers at line 706 (second level nested within the first level) to the attribute ATT1 of line 708. The foregoing aggregate application of qualifiers may be repeated for each lower level of nesting contained within a higher level of nesting. For example, qualifiers from lines 702 and 718 are applied in combination to all members of the class "name2".

It should be noted that variations in evaluating qualifiers in connection with embedded classes of composite classes may be provided. For example, a different logical evaluation in connection with aggregating or combining qualifiers of different levels may be provided.

Figure 9:
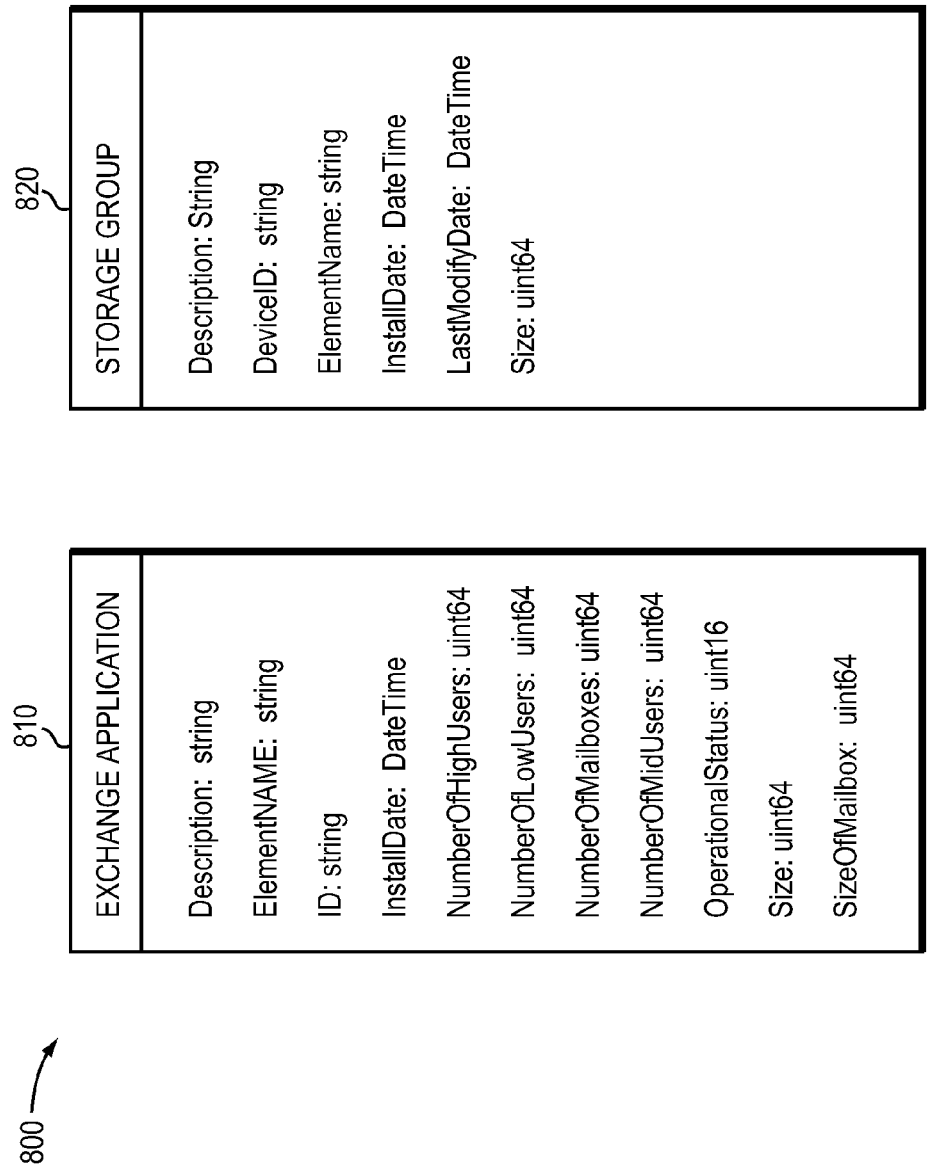
FIG. 9 is an example of class definitions that may be used in an embodiment in accordance with techniques herein.

To illustrate, referring to FIG. 9, shown is an example 800 of class definitions. In the example 800, two class definitions are provided for an email application, Exchange application 810 (e.g., for the Microsoft Exchange™ electronic mail application), and for a storage group 820. A storage group may generally refer to a grouping of one or more devices of a data storage system. For example, the email application represented by an object of class 810 may have storage provisioned on one or more devices of the data storage system which may be logically separated into one or more LUNs. The one or more devices used by the email application for storage may be included in a storage group represented by an object of class 820. Depending on the role and/or expertise of the user, the information accessible to the user and allowable operations in connection with data storage management for the email application may vary. Thus, the techniques herein may be used to provide an object model for the user in accordance with the user's role and/expertise for data storage management as specified with qualifiers.

The example 800 provides exemplary class definitions for objects as may be included in an embodiment for performing data storage management operations, such as storage provisioning, for an application corresponding to a class definition for 810.

Varying portions of objects of each of the two classes of FIG. 9 may be accessible to a user in accordance with the role and/or expertise level associated with the user. What will now be described are examples of how to specify, in accordance with role and/or level of expertise, which portions of the objects are accessible to the user and thus included in the object model for the user.

Referring to FIG. 10 shown is an example of information that may be included in a template specifying qualifiers for the class ExchangeApplication that is derived from another class (e.g., super class or parent class) EMC_ExchangeApplication. The example 900 includes information of a template that may be used in connection with specifying qualifiers for the class 810 of FIG. 9. In the example 900, particular language syntax is specified so that the list of role(s) is specified using the keyword EMC_Roles and the list of expertise level(s) is specified using the keyword EMC_UserLevel. For example, lines 902 and 904 specify the qualifiers for the class ExchangeApplication and indicate that a user having a role of administrator, manager or monitor, and also having an expert level of sophistication may access any member or item within the class ExchangeApplication of 900. The administrator role also has write access to all elements which are writable or modifiable, such as via a method call to modify one or more attributes. As described below, this example 900 does not specify any methods such as may be used in connection with other classes. Line 910 specifies qualifiers for the Size attribute (line 912) expanding access of this attribute to users having an expertise of novice or generalist. Line 916 specifies qualifiers for the ID attribute (line 918) expanding access of this attribute to a user having an expertise level of novice or generalist. Lines 922 specifies qualifiers for the NumberOfMailboxes attribute (line 924) expanding access of this attribute to a user having an expertise level of generalist. Line 928 specifies qualifiers for the SizeOfMailbox attribute (line 930) expanding access of this attribute to a user having an expertise level of generalist. Line 946 specifies qualifiers for the Description attribute (line 948) expanding access of this attribute to a user having an expertise level of novice or generalist. Line 952 specifies qualifiers for the ElementName attribute (line 954) expanding access of this attribute to a user having an expertise level of novice or generalist. Other attributes of the example 900 which do not have additional qualifiers are restricted to users having roles and expertise levels as indicated in lines 902 and 904.

Specifying the qualifiers at the class or outermost level in lines 902 and 904 has the same effect as specifying the qualifiers of lines 902 and 904 for each item or member embedded within the class (e.g., for each attribute of an object of the class where each attribute is included as a member in the class definition 810). More generally, the qualifiers specified at a first level of the qualifier scoping hierarchy (e.g., lines 902, 904) are applied in combination with any other qualifiers of other lower levels (e.g., line 910) of the qualifier scoping hierarchy nested within the foregoing first level.

Figure 11:
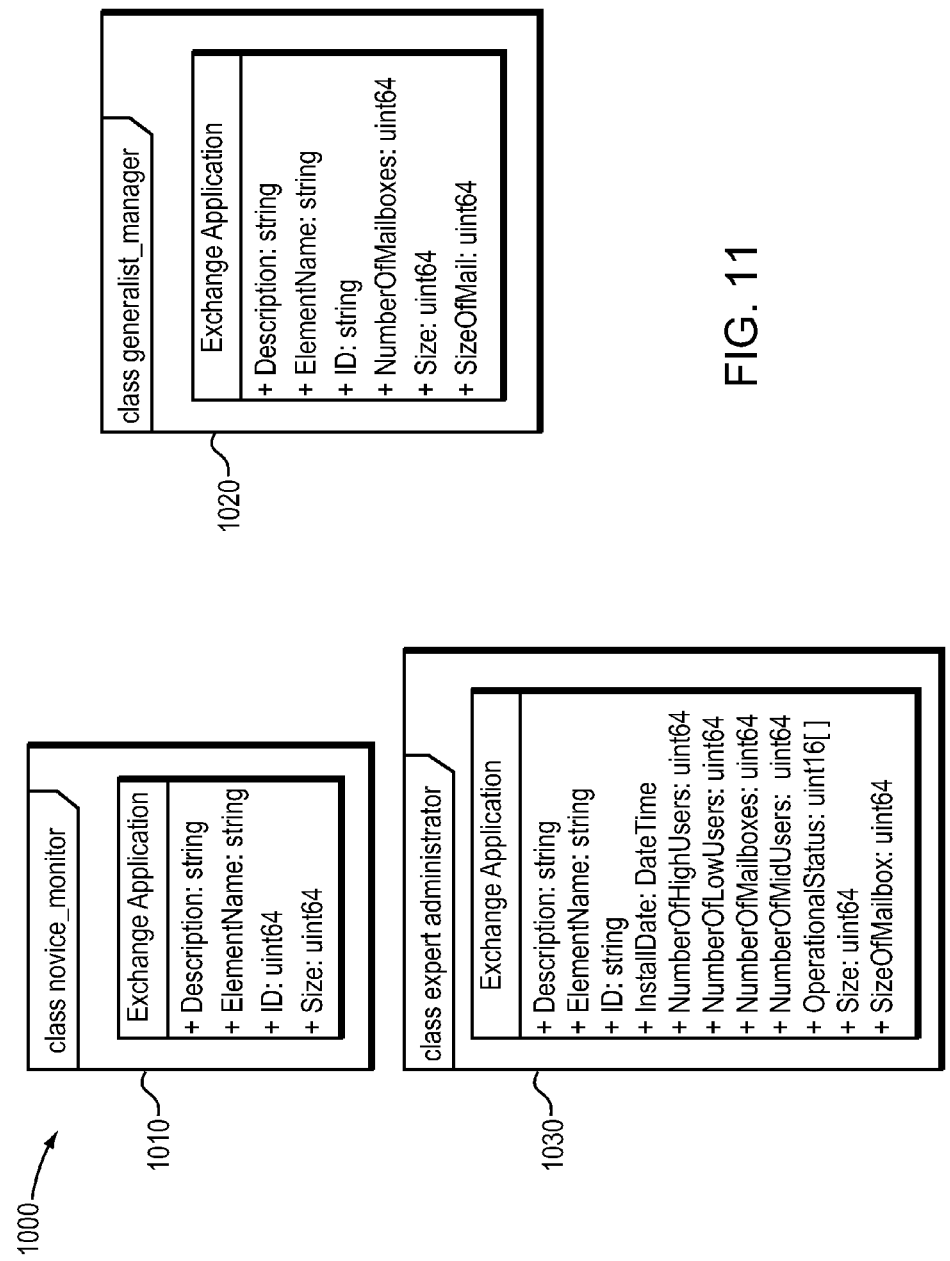
FIGS. 11, 13, 15, 16, 17A and 17B are examples illustrating variations in object models based on user role and expertise using a template in accordance with techniques herein.

In accordance with the template description of FIG. 10, reference is now made to the example 1000 of FIG. 11.

Referring to FIG. 11, shown is an example representation of the object models for the Exchange Application class for different users having particular combinations of role and level of expertise. Element 1010 represents an object model for an object of the class "ExchangeApplication" as illustrated in FIG. 11 for a user having a novice expertise level and a role of monitor. Element 1010 may represent those attributes of the object instance of class ExchangeApplication which are accessible such as for viewing/reading by the novice monitor. Element 1020 represents an object model for a user having a generalist expertise level and a role of manager. Element 1020 may represent those attributes of the object or instance of class ExchangeApplication which are accessible such as for viewing/reading by the generalist manager. Element 1030 represents an object model for a user having an administrator role and an expert level of expertise level. Additionally, the user as an administrator has write access to all elements of the object instance. Element 1030 may represent those attributes of the object instance of class ExchangeApplication which are accessible such as for viewing/reading and also for writing by the expert administrator.

Based on the foregoing example 1000, as the level of expertise increases, the number of attributes accessible to the user may also increase.

Referring to FIG. 12, shown is an example of information that may be included in a template specifying qualifiers for the class StorageGroup. The example 1100 includes information of a template that may be used in connection with specifying qualifiers for the class 820 of FIG. 9 (e.g. all objects of class 820). Lines 1102 and 1104 specify the qualifiers for the class StorageGroup and indicate that a user having a role of administrator or manager, and also having an expert or generalist level of expertise may access any item or member within an object of the class StorageGroup of 1100. No additional qualifiers in the example 1100 are specified at the lower nested qualifier levels such as in connection with individual attributes of the class. It should be noted that EMC_ExchangeStorageGroup may represent a superclass or parent class as described in connection with the class EMC_ExchangeApplication of FIG. 10.

Specifying the qualifiers at the class or outermost level in lines 1102 and 1104 has the same effect as specifying the qualifiers of lines 1102 and 1104 for each item or member contained within the class (e.g., for each attribute of an object of the class where each attribute is included as a member in the class definition 820). More generally, the qualifiers specified at a first level of the qualifier scoping hierarchy (e.g., lines 1102, 1104) are applied to other lower levels of the qualifier scoping hierarchy nested within the foregoing first level. In accordance with the template portion of FIG. 12, reference is made to the example 1200 of FIG. 13.

Figure 13:
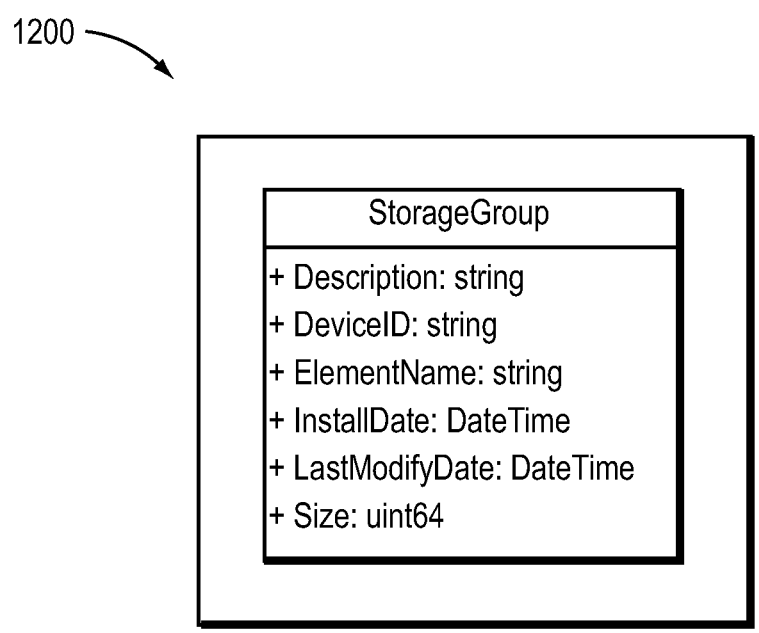

Referring to FIG. 13, shown is an example representation of the object model for the StorageGroup class. The example 1200 represents an object model for an object of the class StorageGroup (e.g., from FIG. 12) for a user who is an expert or generalist, and also has a role of administrator or manager. The example 1200 may represent those attributes of the object of class StorageGroup which are accessible such as for viewing/reading by a user having an appropriate role and expertise level in accordance with the object level qualifiers of lines 1102 and 1104 of FIG. 12. It is noted that a user having a novice expertise level, such as the novice monitor described in connection with element 1010 of FIG. 11, cannot access or otherwise view the storage group object (or any portion thereof) of the example 1200.

Described in paragraphs above is one type of association between a first object, a composite object of a composite class, and a second raw or basic object, which is an embedded object of the first object where the embedded object has a type which is a class. The template and language used may also provide for representing additional relationships or associations, such as between objects and classes. Described in following paragraphs and figures is an exemplary additional associations that may be included.

Referring to FIG. 14, shown is an example of a portion of a template that may be used to describe an association or relationship. The example 1300 may be included in a single template with the description language portions from FIGS. 10 and 12. As noted above, FIG. 10 specifies qualifiers for a first class, ExchangeApplication. FIG. 12 specifies qualifiers for a second class, StorageGroup. A second object of the second class may represent a storage group from which storage is provisioned for use by the email application represented by a first object of the first class. The example 1300 may be used to specify the foregoing association or relationship between the first and second objects. In a manner similar to that as described in connection with FIGS. 10 and 12, lines 1302 and 1304 specify the qualifiers (e.g., as a list of roles at 1302 and a list of expertise levels at line 1304) for this association. In this example, associations are implemented using classes where there are two or more attributes of type class that reference instances of the classes. The association has a name, "Component", corresponding to the class at line 1306. The class "EMC_Component" is the parent class of the particular association between the objects identified in lines 1312 and 1314. Other classes for different corresponding named associations may also be defined. Line 1312 identifies a first member "GroupComponent" which is an address of, or more generally, a reference (REF) to, an object of class ExchangeApplication. Line 1314 identifies a second member "Part Component" which is an address of, or more generally, a reference (REF) to, an object of class StorageGroup. Although not illustrated herein for an object of class Component 1300, the members thereof may then be assigned values to represent the foregoing association or relationship. In particular, the first member (line 1312) of the object may be assigned the address of the first object (e.g., an instance of the class ExchangeApplication). Similarly, the second member (line 1314) of the object may be assigned the address of the second object (e.g., an instance of the class StorageGroup).

The qualifiers of lines 1302 and 1304 indicate that this association is included in an object model for a user having a role of administrator, monitor or manager, and also having an expertise level of generalist or expert. Based on these qualifiers, the association between the first object of class ExchangeApplication and second object of class StorageGroup is included in the object model for the generalist manager and expert administrator. However, as with the class StorageGroup described in FIG. 13, the association specified by the class_Component is not visible to, or included in the object model for, a novice monitor.

Figure 15:
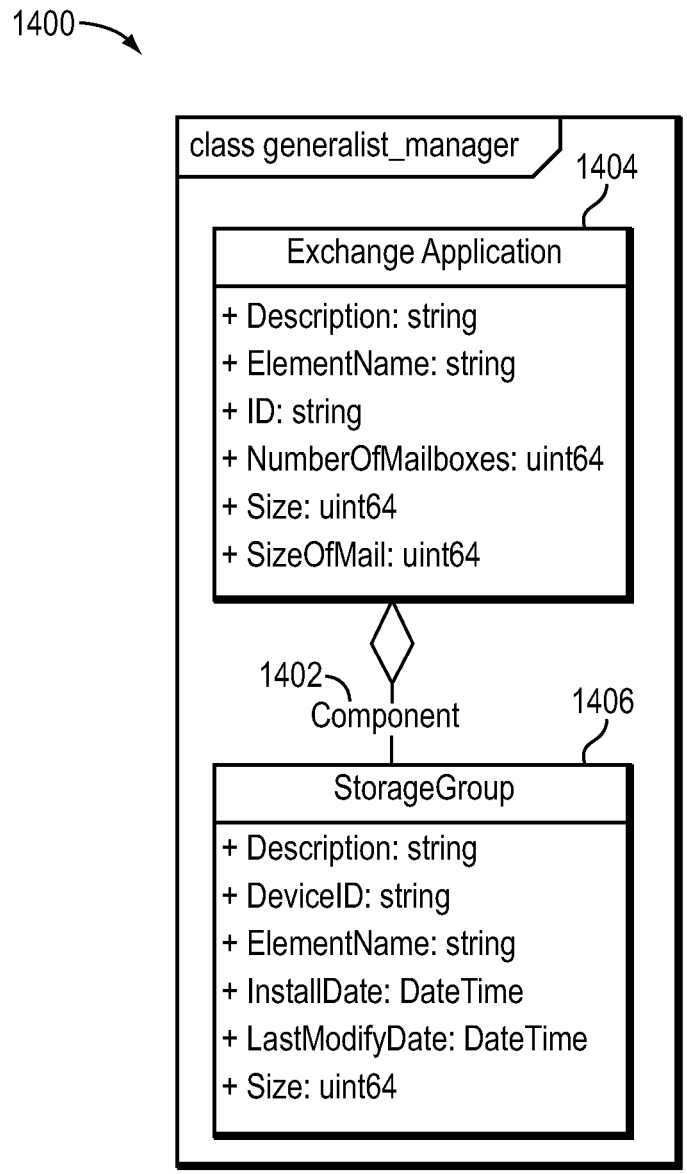
Figure 16:
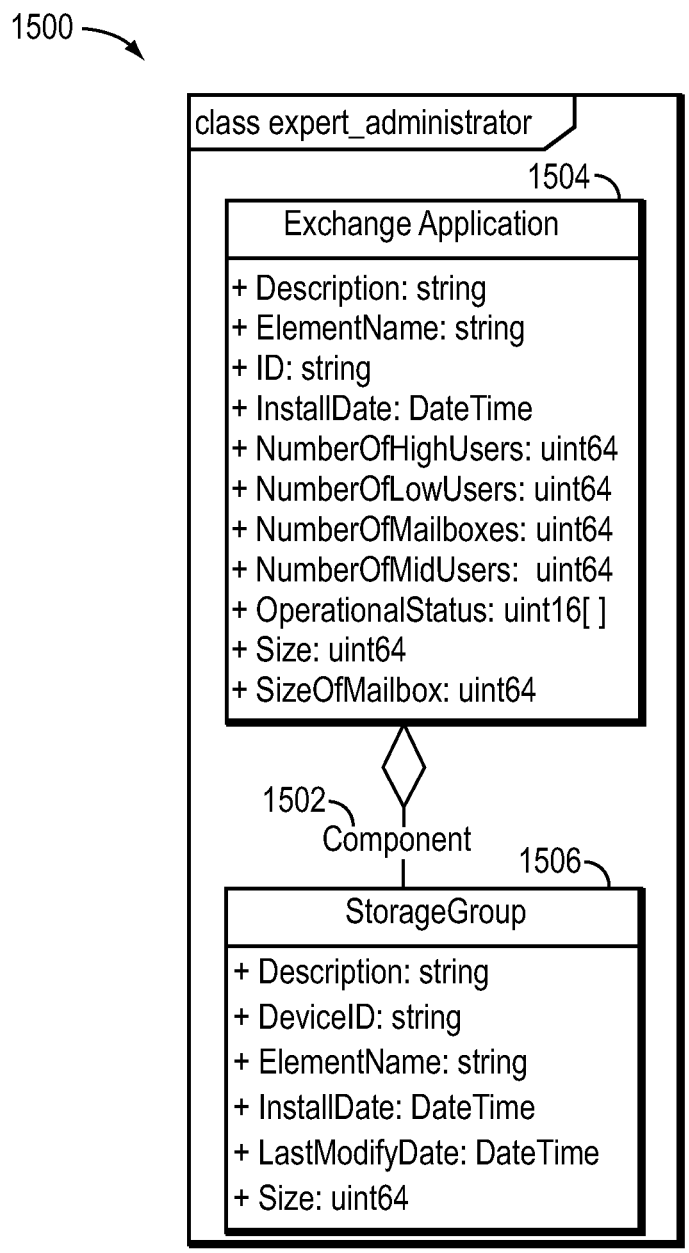

In an example having the classes of objects and qualifiers as described in connection with FIGS. 10-14 above, the object model for the generalist manager may be as illustrated in FIG. 15 and the object model for the expert administrator may be as illustrated in FIG. 16. The object model for the novice monitor includes only those portions of the class as illustrated by 910 of FIG. 10. In FIG. 15, the association described above in FIG. 14 is illustrated as element 1402 and the connection between classes represented by 1404 and 1406. In FIG. 16, the association described above in FIG. 15 is illustrated as element 1502 and the connection between classes represented by 1504 and 1506.

Figure 17A:
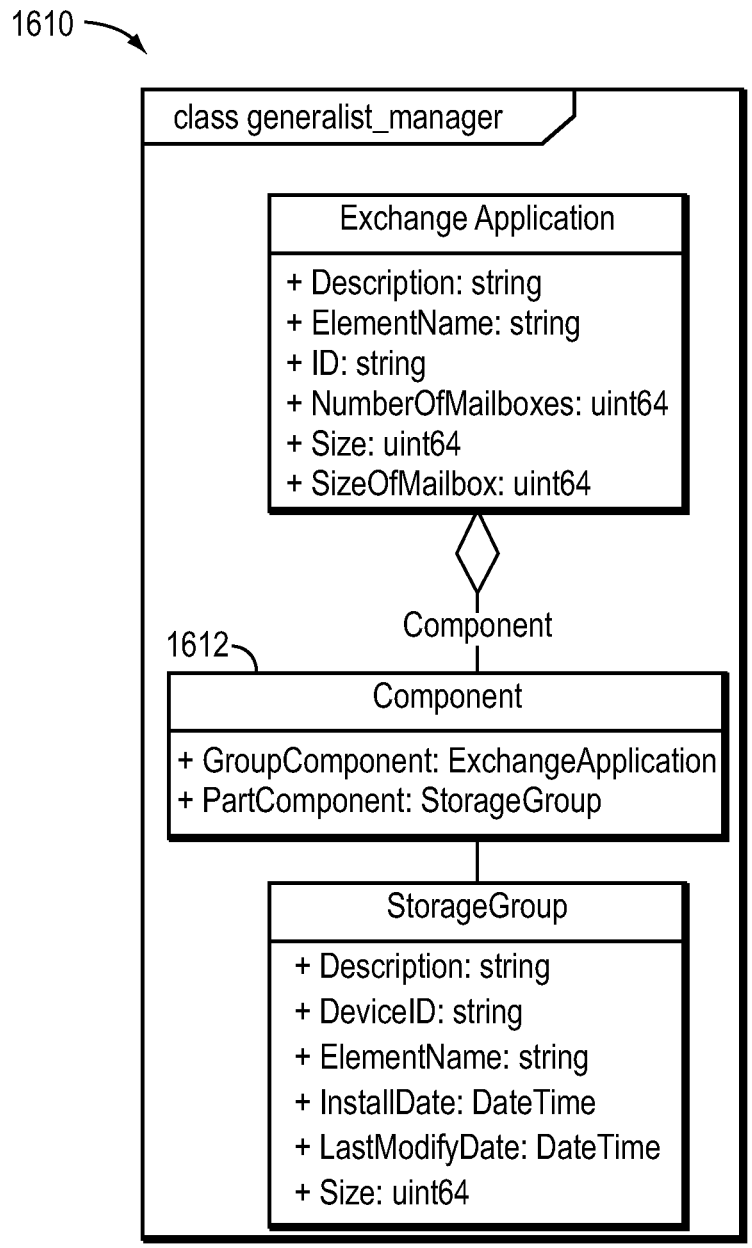
Figure 17B:
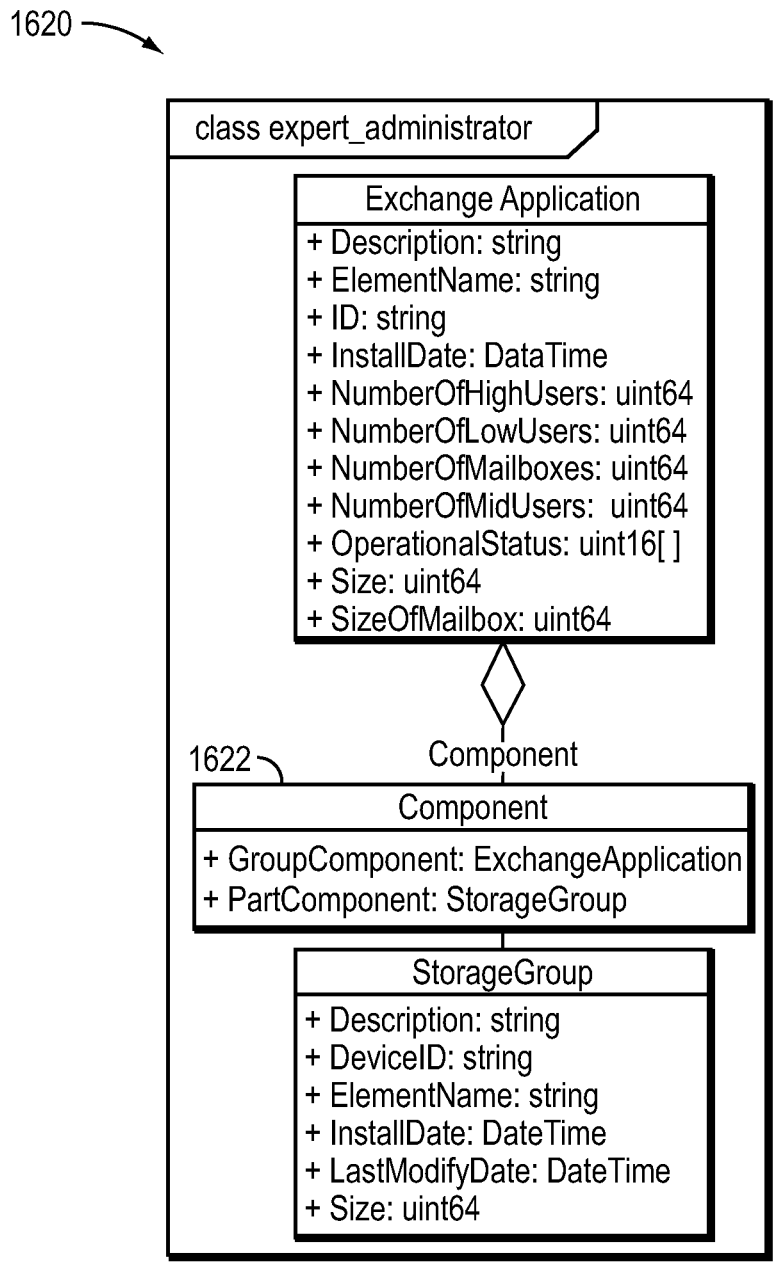

FIGS. 17A and 17B illustrate an alternative way in which to represent an association as a class. FIG. 17A is an alternate representation of the example of FIG. 14 where the association may be represented using element 1612. FIG. 17B is an alternate representation of the example of FIG. 15 where the associate may be represented using element 1622. It should be noted that the object model as just described in connection with the foregoing examples with qualifiers as applied to a class definition may also be more generally referred to as a class model for objects which are instances of the particular classes. For example with reference to FIG. 15, the element 1404 may represent a view, or allowed access, with respect to all objects of the class ExchangeApplication for a generalist manager and element 1406 may similarly represent a view, or allowed access, with respect to all objects of the class StorageGroup.

Figure 18:
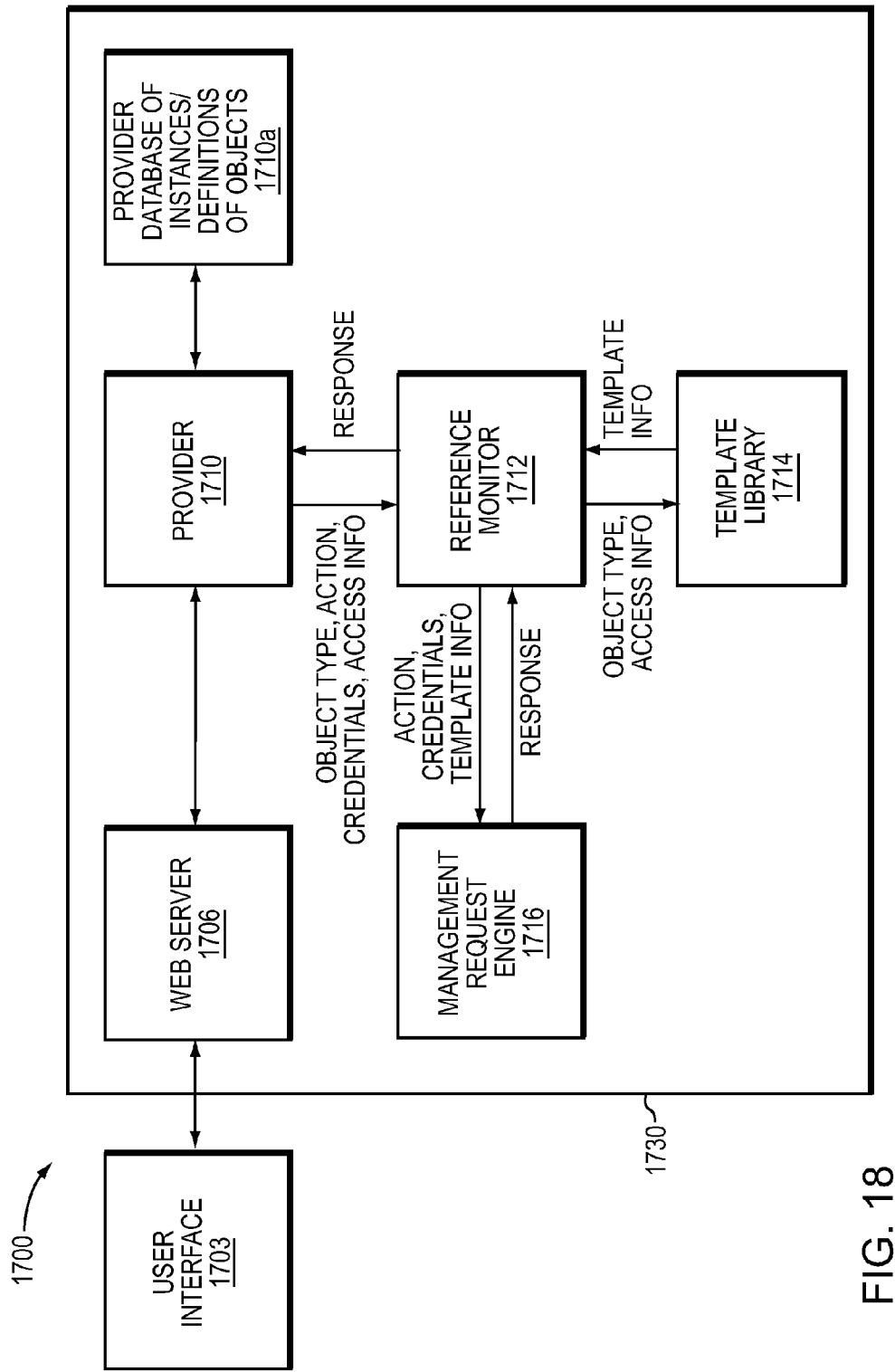
FIG. 18 is an example illustrating components that may be included in an embodiment in accordance with techniques herein.

Referring to FIG. 18, shown is a block diagram of an embodiment of the current techniques. The example 1700 includes a user interface 1703 such as a command line interface (CLI) or a graphical user interface (GUI), a web server 1706, a provider 1710, a provider database of instances and/or definitions of objects 1710a, a reference monitor 1712, a template library 1714, and a management request engine 1716. The user interface 1703 may reside on a client, such as a client computer. The other components of FIG. 21 may be included in one or more server computers or systems 1730.

The provider 1710 may provide instances and/or definitions of objects for a particular service or application. For example, provider 1710 may be an email application provider. The provider database of instances and/or definitions of objects 1710a may include instances and/or definitions of objects defined in accordance with templates as discussed herein. The templates may identify which portions of the objects, such as the attributes and methods, are accessible to a user based on qualifiers in the template. By limiting or restricting access to portions of an object, the current techniques may cause a user to be presented with a customized object model for data management of the email application in accordance with, for example, a role and/or expertise assigned to the user. The customized object model may, for example, limit or restrict access to particular data values related to data storage management for the email application and may limit or restrict the ability to perform particular operations (e.g., methods for viewing, modifying, deleting, and creating particular data values in connection with data storage management). Provider database 1710a may include instances and/or definitions of objects of a class (e.g., initialized with appropriate data values), for example, for the particular class and associated qualifiers described by FIG. 10.

The reference monitor 1712, in communication with the template library 1714 and management request engine 1716, may control software access to instances and/or definitions of objects within the provider database 1710a. In at least one embodiment, such objects may be, for example, related to raw storage devices that may be provisioned for various uses and in various ways. In a particular embodiment, a storage device may be provisioned by the use of, for example, a LUN object. The LUN object may contain various storage device attributes and methods that correspond to, for example, RAID type or stripe size. Thus, in some embodiments, the reference monitor may provide centralized control for the provisioning of underlying storage devices.

The template library 1714 may include templates as described, for example, in FIGS. 10, 12 and 14. In at least one embodiment, an object may be associated with a single template. In an alternative embodiment, template library 1714 can contain a multitude of templates for the same object. In this embodiment, each template for the same object can be associated with a different situation. For example, as discussed further below, an embodiment may utilize reference monitor 1712 to determine an appropriate template for an object based on various factors.

The management request engine 1716 is responsible for determining whether a particular action on an object is allowed based on information provided to it by the reference monitor 1712.

Figure 19:
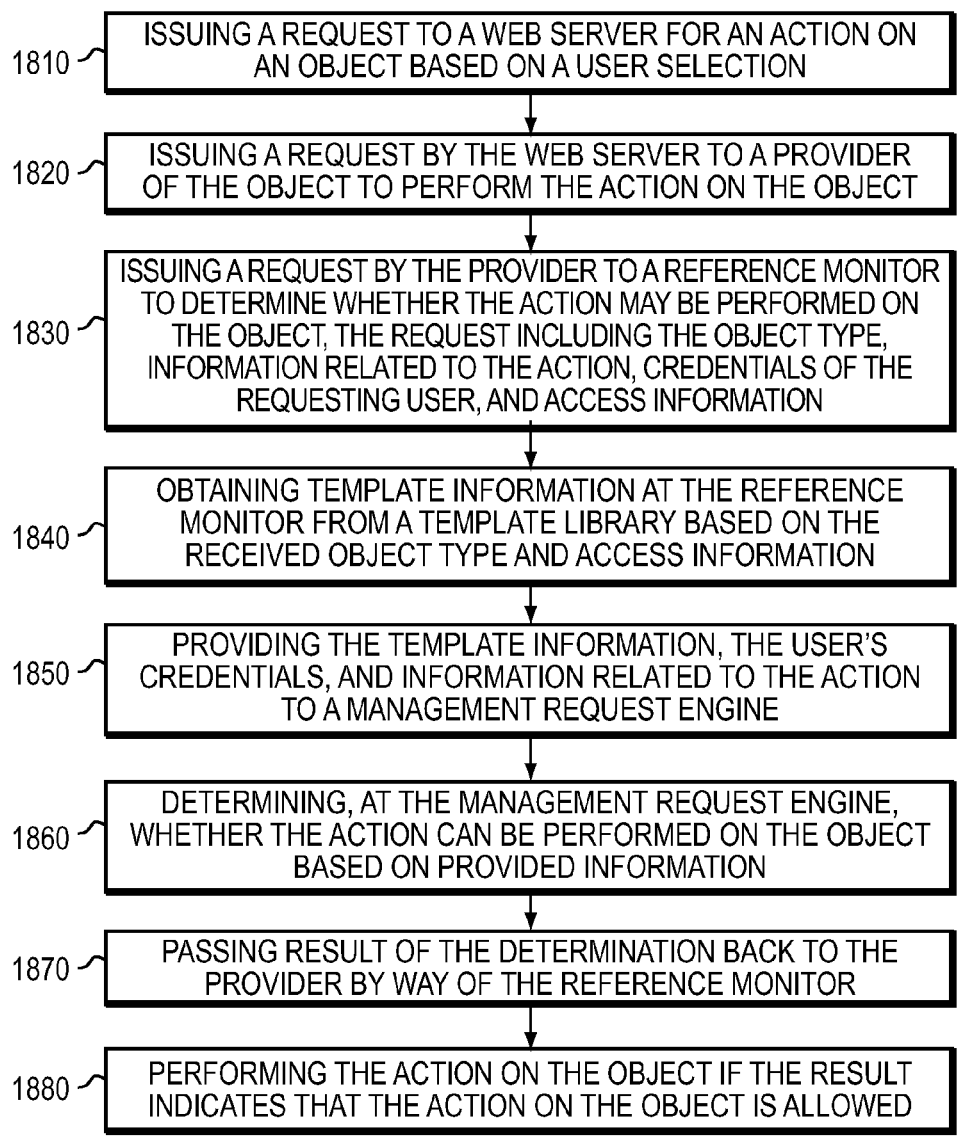
FIG. 19 illustrates steps that may be performed in accordance with techniques herein.

To illustrate processing that may be performed by the components of FIG. 18, reference will be made to FIG. 19. A user may logon using the user interface 1703 to perform a data storage management operation, such as, for example, provisioning storage for an email application corresponding to the object of a class as described above, for example, in connection with FIG. 11. The user may provide information, such as a user name and password, using the user interface 1703 which is communicated to the web server 1706 for authentication. A role and level of expertise, such as generalist manager, may be assigned to the user, which may be used in restricting access to an object of a class.

After login, the user interface 1703, based on a user selection, may issue a request to the web server 1706 for a desired action to be performed on an object stored within the provider database of objects 1710a (step 1810). A subsequent request is issued by the web server 1706 to the provider 1710 to perform the particular action on the specified object (step 1820). To determine whether the action may be performed on the specified object by this particular user, the provider 1710 may issue a request to the reference monitor 1712 (step 1830). In accordance with the current techniques, the request may provide an object type, the desired action related to the object, user credentials such as the role and/or the level of expertise of the requesting user, and access information such as the date access is requested for the object, the time access is requested for the object, the physical and/or logical location from which access is requested, and energy and/or usage statistics related to the components or devices related to the object (step 1830). In some embodiments, the user credentials may include additional information such as, for example, a unique user identifier and password. Access information encompasses any information that may assist the reference monitor 1712 in determining the appropriate template to be used for a specific object out of a multitude of templates associated with the object.

Based on the object type and the access information, the reference monitor 1712 may then obtain template information from the appropriate template within the template library 1714 (step 1840). The obtained template information can then be passed to the management request engine 1716 along with information pertaining to the requesting user's credentials (e.g., role and/or level of expertise, username and password), the type of object, and the desired action (step 1850). The management request engine 1716 determines, based on the provided information, whether the desired action is allowed or not allowed (step 1860). In at least one embodiment, the management request engine 1716 may also determine that a desired action is allowed with qualifications, e.g., it is allowed only when certain conditions are satisfied. The determination made by the management request engine 1716 is then returned to the reference monitor 1712, which in turn passes the result on to the provider 1710 (step 1870). If the result indicates that the desired action is allowed, the provider 1710 proceeds with the desired action on the specified object (step 1880). Otherwise, the action is not performed.

In an example embodiment in accordance with the current techniques, an "expert manager" of an email application such as discussed above with reference to FIGS. 9 through 12 may use a GUI interface to request the provisioning of a mailbox. Once the desired mailbox attributes have been selected, the user may initiate the provisioning, resulting in a request being issued to a web server and a subsequent request being issued to one or more providers of one or more objects necessary to fulfill the provisioning request. One such object may be a LUN object, which may be, for example, associated with a StorageGroup object as discussed above in relation to FIGS. 9 and 12.

In some embodiments, as part of the user's selection of mailbox attributes, the user may select to have one LUN of a designated size associated with the mailbox. In this embodiment, before a relevant provider attempts to instantiate a new LUN object with a designated size, it must be determined whether the "expert manager" of the email application may define the size of a LUN. Thus, in this example embodiment, the relevant provider may send a request to a reference monitor that is responsible for provisioning raw storage devices, the request containing access information, and information specifying that the user desires to designate the size of a LUN object and that the user is an "expert manager." The reference monitor may then obtain, from a template library, template information for the LUN object based on the access information. The template information for the object may then be passed to a management request engine along with the fact that the user is an "expert manager" and that the user wants to designate the LUN size. In an alternative embodiment, additional user credentials (e.g., a unique user identifier and password) may be used in the template selection process and the additional credentials may also be passed to the management request engine to help determine whether an action may be performed.

As an example, access information passed to the reference monitor may signify that the data storage system responsible for providing storage space for the email application is low on available storage space. Based on this additional information, the reference monitor may obtain a template that, for example, more aggressively restricts the ability to designate the size of a LUN object. This template information may then be passed to the management request engine.

The obtained template may have a LUN object description annotated with qualifiers identifying which portions of the LUN object are accessible to the requesting user based on, for example, a role and/or level of expertise. In a case in which an "expert manager" may designate LUN size based on, for example, a qualifier associated with a LUN object size attribute, which is reflected in the LUN template, the management request engine produces a result informing the reference monitor that the user may designate LUN size. This result is then passed back to the provider and, based on this result, the provider proceeds with or denies the user's provisioning request.

In some embodiments, the result may specify that the particular user is allowed to designate LUN size, but the user may be restricted to a specific range of sizes due to, for example, a different user role or level of expertise.

Some embodiments may also provide the option to preprocess templates. For example, in a particular embodiment, the management request engine 1716 of FIG. 18 may obtain templates for pre-processing, which may increase the processing speed of subsequent user requests.

In connection with the foregoing, the template in accordance with techniques herein may be used to provide different object models for a user in accordance with, for example, a level of expertise and/or role associated with the user as well as access information, as discussed above. The object model may be used to vary or otherwise restrict information available to the user, and vary or otherwise restrict operations the user can perform on the information. The object model may be used in connection with information and operations displayed to the user. For example, if the object model for a user having a particular role and expertise level specifies that only a portion of the object data is viewable or accessible to the user, only information included in that portion of the object data may be displayed to the user. Similarly, if the object model specifies that the user is allowed to perform a first operation or method but not a second operation or method, the user interface may be populated with appropriate information and options for the first operation or method but not the second operation or method.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method, comprising:

managing object access in a hierarchical object model comprising a plurality of objects, wherein the objects in the hierarchical object model comprises object information which includes attributes describing different aspects of the object and methods that can be invoked to perform operations on the object;

receiving a request at a reference monitor in a computer system, wherein the request comprises an object type, access information, information relating to an action associated with the object in the hierarchical object model, and credentials associated with a user comprising a role and a proficiency level of the user, wherein the role and the proficiency level can control access to an object and object information associated with the object;

based on the object type and the access information, obtaining template information at the reference monitor from a template within a template library in the computer system, wherein the template defines a role having associated proficiency levels for the role and specifies the object and object information accessible for each proficiency level;

providing, from the reference monitor to a management request engine in the computer system, the template information, the information relating to the action associated with the object in the hierarchical object model and the credentials associated with the user comprising the role and proficiency level of the user; and determining at the management request engine whether to allow the action associated with the object in the hierarchical object model based on the template information, the information relating to the action associated with the object in the hierarchical object model and the credentials associated with the user comprising the role and proficiency level of the user;

wherein information provided in a user interface depends on the determination as to whether to allow the action.

2. The method of claim 1 wherein the action is allowed with qualifications.

3. The method of claim 1 wherein the template information is obtained from a template library wherein the template library contains templates for different objects.

4. The method of claim 3 wherein the template library contains a multitude of templates for each object.

5. The method of claim 4 wherein each template in a multitude of templates for an object have different qualifiers for the object.

6. The method of claim 1 wherein the object is a LUN.

7. The method of claim 1 wherein the template information is obtained from a pre-processed template.

8. The method of claim 1 wherein the access information includes at least one of the following:
the time access is requested for the object;
the physical location from which access is requested;
the logical location from which access is requested;
energy statistics associated with the object; and
usage statistics associated with the object.

9. A system for use in managing object access in a hierarchical object model, the system comprising:
a processor; and
a memory storing the hierarchical object model comprising a plurality of objects, wherein the objects in the hierarchical object model comprises object information which includes attributes describing different aspects of the object and methods that can be invoked to perform operations on the object, memory further storing instructions which are executed by the processor for carrying out the steps of:
receiving a request at a reference monitor in a computer system, wherein the request comprises an object type, access information, information relating to an action associated with the object in the hierarchical object model, and credentials associated with a user comprising a role and a proficiency level of the user, wherein the role and the proficiency level can control access to an object and object information associated with the object;
based on the object type and the access information, obtaining template information at the reference monitor from a template within a template library in the computer system, wherein the template defines a role having associated proficiency levels for the role and specifies the object and object information accessible for each proficiency level;
providing, from the reference monitor to a management request engine in the computer system, the template information, the information relating to the action associated with the object in the hierarchical object model and the credentials associated with the user comprising the role and proficiency level of the user; and
determining at the management request engine whether to allow the action associated with the object in the hierarchical object model based on the template information, the information relating to the action associated with the object in the hierarchical object model and the credentials associated with the user comprising the role and proficiency level of the user;
wherein information provided in a user interface depends on the determination as to whether to allow the action.

10. The system of claim 9 wherein the action is allowed with qualifications.

11. The system of claim 9 wherein the template information is obtained from a template library wherein the template library contains templates for different objects.

12. The system of claim 11 wherein the template library contains a multitude of templates for each object.

13. The system of claim 12 wherein each template in a multitude of templates for an object have different qualifiers for the object.

14. The system of claim 9 wherein the object is a LUN.

15. The system of claim 9 wherein the template information is obtained from a pre-processed template.

16. The system of claim 9 wherein the access information includes at least one of the following:
the time access is requested for the object;
the physical location from which access is requested;
the logical location from which access is requested;
energy statistics associated with the object; and
usage statistics associated with the object.

* * * * *